Dec. 5, 1950   R. D. NELSON   2,532,510
THERMALLY RESPONSIVE INDICATOR
Filed May 20, 1944
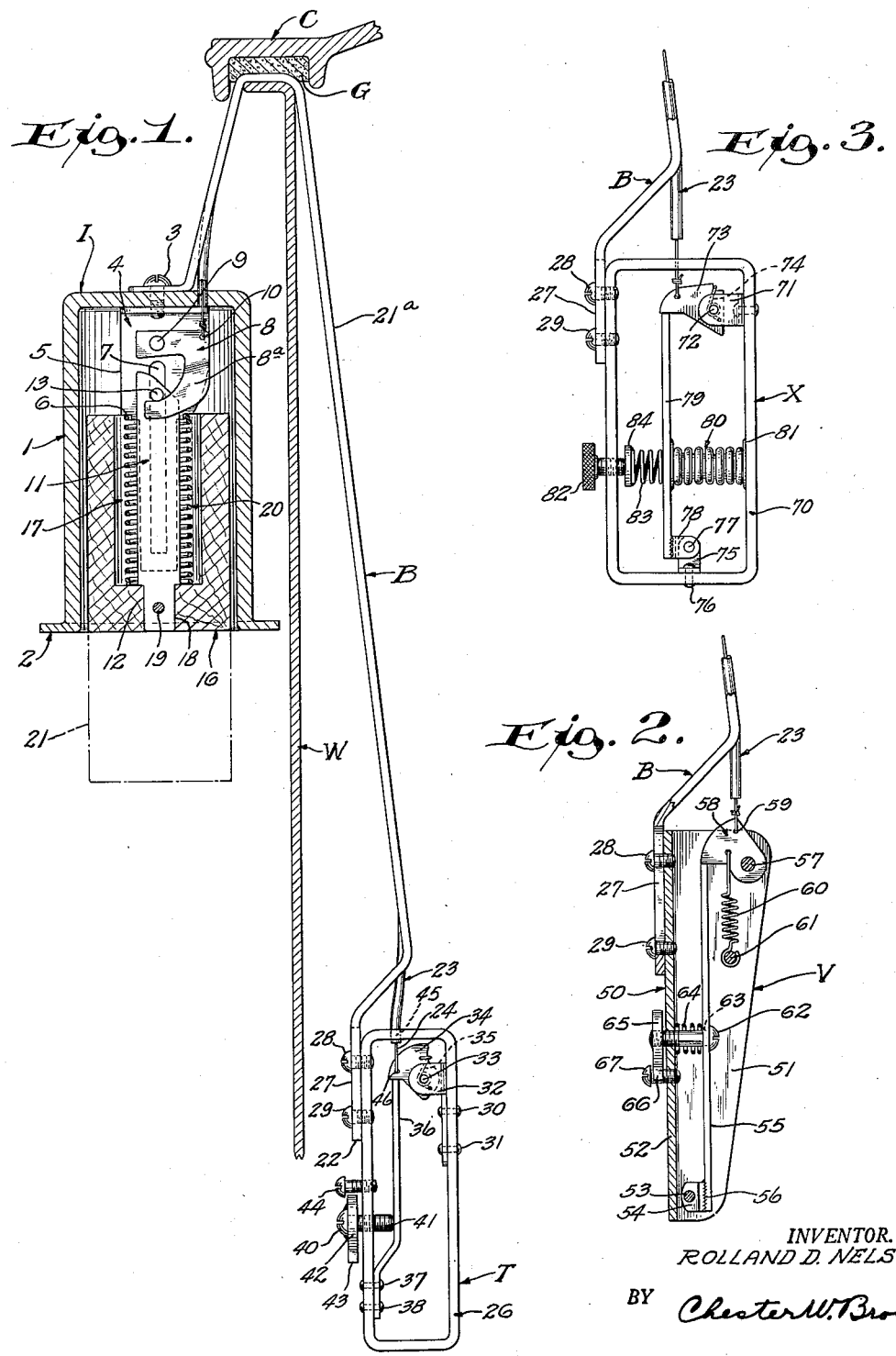
INVENTOR.
ROLLAND D. NELSON.
BY Chester W. Brown
ATTORNEY.

Patented Dec. 5, 1950

2,532,510

UNITED STATES PATENT OFFICE 2,532,510

THERMALLY RESPONSIVE INDICATOR

Rolland D. Nelson, Hales Corners, Wis., assignor to McGraw Electric Company, a corporation of Delaware Application May 20, 1944, Serial No. 536,636

2 Claims. (Cl. 74—2)

My invention relates to thermally responsive load indicators for oil immersed electrical apparatus such as transformers.

Transformers, when subjected to constant overload conditions, become heated and there results an overheating of the oil within the transformer casing. Excessive and constant heat tends to destroy the coil insulations and ultimately renders the transformers useless.

Assuming the maximum operating temperature for a transformer coil is 95° C., any temperature beyond this maximum would tend to destroy the coil insulation. It is estimated that the expectant life of a transformer is halved for every 8° C. its operating temperature exceeds its maximum operating temperature. The oil within the transformer casing is cooler than the coil by approximately 10° C. and, therefore, the maximum safe operating temperature of the transformer is in the assumed case 10° C. less than 95° C. or 85° C.

In the larger transformers, such as those used at substations, there are provided thermometers to indicate their temperature. However, it has not been found practical to provide such temperature indicating means for transformers rated below 100 kva., particularly those mounted atop poles, the problem of reading the thermometers and the item of cost being the principal objections thereto.

From the foregoing it will be observed that there is a need for an indicator for distribution transformers which is inexpensive, simple, and efficient, which will give visual indication of transformer overload conditions, which may be readily installed in existing equipment, and which may be reset for future operations without disturbing any of the equipment with which it is associated.

As will be apparent, the purpose of an indicator is to give visual indication that a transformer is overloaded. When it is known that a transformer is overloaded, the practice is to replace it with one of sufficient capacity to meet the demands.

Heretofore, because of the fact that indicating equipment has been too expensive to install and maintain, many transformers have been permitted to burn out before replacing them with larger ones. My invention now makes it possible to equip with indicators transformers which have previously been without such.

It is essential in providing a temperature indicator that the device be made so that the thousands of transformers now in service can readily be equipped with them without the slightest alteration.

Therefore, it is an object of my invention to provide a thermostatically controlled load indicator for oil immersed apparatus, such as transformers, which can easily be installed on equipment now in service without making alterations or additional openings in the casings.

Another object of my invention is to provide a load indicating device which has its signal or indicating means positioned exteriorly of the transformer tank and controlled by mechanism positioned interiorly thereof.

It is a further object of my invention to provide for transformers a load indicating device having signaling or indicating means which is readily visible from a distance so as to make it possible to see it from the ground when the device is used on a transformer mounted atop a pole.

Another object of my invention is to provide a thermostatically controlled indicating device having signaling or indicating means which will remain in concealed position unless the temperature exceeds a predetermined maximum.

It is still another object of my invention to provide a temperature indicating device having indicating or signaling means which is normally in non-indicating position and which can be set to trip to indicating position at any temperature within a definite range, such as between 60° to 100° C.

Another and a very important object of the present invention is to provide a transformer load indicator which, though the signaling or indicating mechanism is located exteriorly of the transformer tank and the thermally responsive tripping mechanism is positioned within the tank, can be reset after each operation without opening the transformer tank or removing the device therefrom.

Several embodiments of my invention are shown in the accompanying drawings wherein:

Fig. 1 is a view in side elevation of a preferred embodiment of my thermally responsive load indicating device, the indicating means being shown in section;

Fig. 2 is a view in side elevation of another type of thermally responsive tripping means adaptable to the structure of Fig. 1;

Fig. 3 is a view in side elevation of another type of thermally responsive tripping means adaptable to the structure of Fig. 1;

Throughout the several views, like parts are referred to by the same reference characters.

The thermally controlled load indicating device shown in Fig. 1 comprises a mounting bracket B carrying at one end the indicating device I and at the other end the thermally responsive trip mechanism T. The device is shown mounted on a transformer, the wall W, the cover C, and the gasket G being shown in fragment and in section.

The indicating device I comprises a tubular housing 1 closed at the top and open at the bottom, the bottom portion being flanged at 2. A screw 3 joins the bracket B with the housing 1 at the upper end thereof by means of an inverted L-shaped bracket 4 located interiorly of the housing and with which the screw 3 is threadedly engaged.

The bracket 4 has a long portion 5 which is notched and reduced in width at 6 and slotted at 7, the slotted portion being partially indicated by broken lines. A bell crank or latching lever 8, the lower arm of which is bent outwardly at 8a, is pivotally carried at 9 by the bracket 4 and it has an eyelet 10 at its upper end opposite the pivot point 9.

A rod 11, having a reduced portion 12 at its lower end, is slideably engaged with the long portion 5 of the bracket 4 by means of a shoulder rivet 13 which freely rides in the slotted portion 7.

A cylindrical block 16 reciprocal in the housing 1 has a hollowed out portion 17 within which substantial portions of the bracket 4 and the rod 11 fit. The reduced portion 12 of the rod 11 fits in a slotted portion 18 of the block 16. A pin 19 extending through the block 16 and the reduced portion 12 secures the block in place. A coil spring 20 telescopes the rod 11 and a portion of the bracket 4 and urges the block 16 outwardly of the housing to the position 21 shown in broken lines. One end of the coil spring 20 bears against the notched portion 6 of bracket 4 and the other end bears against the end of the hollowed out portion 17 of the block 16.

Travel of the shoulder rivet 13 is limited by the slotted portion 7 and thus the block 16 is prevented from dropping out of the housing 1.

The shoulder rivet 13 also serves as a lug which the bell crank lever 8 engages to hold the block 16 within the housing in non-indicating position. The outwardly bent portion 8a of the bell crank lever 8 overlaps and just clears the rod 11. The topmost part of the rod 11 is in direct alignment with the unbent part of the lever 8 and engages it when the indicating block 16 is pressed inwardly. This construction permits the easy resetting of the device after it has operated.

The mounting bracket B extends from the housing 1 over the transformer wall W to the thermally responsive trip mechanism T. The bracket comprises a flat strip of metal 21a having a narrow and long slotted portion (not shown) in the middle thereof, and it extends from the housing 1 to a point 22 on the tripping mechanism T. A small copper tube 23 fits within the slot of the strip 21a and a fine wire 24 is placed within the tube 23. One end of the wire 24 is attached to eyelet 10 of the bell crank lever 8 and the other end is connected with the trip mechanism T.

The tripping device T is normally immersed in oil (not shown) within the transformer casing. It comprises a rectangular shaped base 26 attached to and supported by the bracket B, the supporting means comprising a slotted portion, indicated by numeral 27, of bracket band screws 28 and 29 extending through said slotted portion and threadedly engaging the base 26. Rivets 30 and 31 attach a U-shaped bracket 32 to the base 26. Pin 33 extends through the projecting portions of the bracket 32 and it pivotally carries an operating lever 34.

A coil spring 35 encircling the pin 33 actuates the lever 34 in a counterclockwise direction.

A bimetal strip or latch 36, attached to the lower end of the base 26 by means of rivets 37 and 38, normally assumes the position shown in Fig. 1 and in such position prevents the spring 35 from actuating the lever 34 in a counterclockwise direction.

Means are provided for manually adjusting the temperature at which it is desired to have the tripping mechanism operate. The means comprise a screw 40, threadedly engaged with the base 26, which bears against the bimetal strip at 41. At the head of the screw 40 there is soldered a flat button-like portion 42 which, when rotated, rotates the screw therewith. The head portion 42 has numbers stamped thereon (not shown) to serve as a dial. A laterally projecting portion 43 on the head 42 limits the rotational movement of the head 42 when it contacts the screw 44 which is also threadedly engaged with the base 26.

Copper tube 23 passes through an aperture 45 in the base 26 where it terminates. The wire 24 extends from the tube 23 and is attached to the lever 34 at 46.

Wire 24 extends from the bell crank lever 8 in the housing 1 to the lever 34 of the tripping mechanism T.

The device of Fig. 1 has been designed so that wire 24 normally is not under any strain. It is readily apparent from the drawing that bell crank lever 8 holds spring 20 under compression and that, as a result of this, wire 24 is not constantly under tension.

When the device of Fig. 1 operates, wire 24 travels only a short distance within copper tube 23. Thus even under actual operating conditions wire 24 is not placed under great stress. It is only during resetting of the device that wire 24 is put under any strain, and that is slight and of short duration.

It is to be noted that the slotted portion 27 in bracket B and the screws 28 and 29, which extend through the slotted portion 27 and threadedly engage the base 26, comprise a means for adjusting the tension of wire 24. Loosening of screws 28 and 29 permits the upward and downward movement of the base 26, its travel being limited to the length of the slot 27 of bracket B. The position of the base 26 with respect to the slot 27 thus determines the tension of the wire 24.

The operation of the device shown in Fig. 1 is as follows:

When the oil within the transformer reaches a predetermined temperature, the heat therefrom deflects the bimetal strip 36 in a counterclockwise direction which in turn releases the spring tensioned lever 34. The movement of the lever 34 in a counterclockwise direction draws the wire 24 through the tube 23 and the wire pulls the bell crank lever 8 in the housing 1 in a counterclockwise direction. The counterclockwise movement of the lever 8 disengages it from the lug 13 of the rod 11 and thus permits the spring tensioned indicating or signal block 16, which is attached to the rod 11, to assume an indicating position as shown in dotted lines in Fig. 1. The cylindrical block 16 may be brightly colored to increase its visibility when it is projecting from the housing 1.

All that is necessary to reset the device is to push the indicating block 16 back into the housing 1 to nonindicating position. This movement will force the rod 11 to engage the unbent portion of the bell crank lever 8, moving the lever clockwise and forcing it to again engage the shoulder rivet 13. Thus the bell crank lever is returned to latching position and the wire 24 is pulled through the tube 23 to place the lever 34 in operative position.

The device of Fig. 2 is a tripping mechanism V, adaptable to the structure of Fig. 1, and it includes a base structure 50 comprising a pair of wing portions, only one of which is shown, indicated by the numeral 51, and a web portion 52 joining the winged portions.

The bracket B supports and carries the tripping mechanism V in the same manner as it supports the tripping device of Fig. 1 and there is the same adjusting means provided which includes the slotted portion of bracket B indicated at 27 and screws 28 and 29 extending through said slotted portion and threadedly engaging the web portion 52 of the base 50.

Pin 53 extends through the wing portions of the base 50 at the lower end thereof and carries a U-shaped bracket 54. A bimetal piece or latch 55 is spotwelded to the bracket 54 at 56.

Another pin 57 extends through the wing portions of the base 50 at the right upper end thereof and it carries a lever 58. The wire 24 extending from the copper tube 23 is attached to the operating lever 58 at 59. A coil spring 60, one end of which is attached to a pin 61 extending through the wing portions of base 50, and the other end of which is attached to the lever 58, urges the lever 58 in a counterclockwise direction.

The bimetal piece 55 normally assumes the position shown in Fig. 2 and in such position prevents the spring 60 from actuating the lever 58 in a counterclockwise direction.

A means is provided for manually adjusting the temperature at which it is desired to have the tripping mechanism V operate. The means comprises a screw 62 which extends through an aperture 63 in the bimetal piece 55 and is threadedly engaged with the web portion 52 of the base 50 through which it passes, a coil spring 64 encircling said screw between the bimetal 55 and the web 52 and normally urging the bimetal piece 55 towards latching position with respect to the lever 58, and flange 65 with numerals stamped thereon (not shown) threadedly engaged with screw 62 and soldered thereto. A laterally projecting lug 66 on the flange 65 limits the latter's rotational movement when the lug contacts the screw 67 which is threadedly engaged with the web 52.

The operation of the device of Fig. 2 is like that of Fig. 1 in that a rise in the temperature of the oil within the transformer will deflect the bimetal piece 55 in a counterclockwise direction and release the lever 58 for counterclockwise movement. Its movement will draw the wire 24 through the tube 23 which will release the indicating mechanism as in the device of Fig. 1. Resetting the device is the same process as that described for Fig. 1.

The device of Fig. 3 is a tripping mechanism X, adaptable to the structure of Fig. 1, and it includes a rectangular shaped base structure 70 which is supported and carried by the bracket B, and it is adjustable in position relative thereto in the same manner as the tripping mechanism in the device of Fig. 1.

On the upper right hand side of the base 70 there is mounted a U-shaped bracket 71 through which the pin 72 extends. Pin 72 carries the operating lever 73 which is urged in a counterclockwise direction by the spring 74 encircling the pin 72.

A U-shaped bracket 75, secured to the base 70 by means of rivets 76 (only one shown), carries the pin 77 which pivotally supports another U-shaped bracket 78. A metal strip or latch 79 is spotwelded to bracket 78. Metal strip 79 normally assumes the position shown in Fig. 3 and in such position prevents the spring 74 from actuating the lever 73 in a counterclockwise direction.

Bellows 80, containing a liquid expansible under heat, is soldered to base 70 at 81. The other end of the bellows bears against the metal strip 79.

Thumb screw 82 is threadedly engaged with the base 70. A coil spring 83 is interposed between the metal strip 79 and the screw 82 and a flat disc 84 is attached to the end of the spring which bears against the screw 82. Adjustment of the latching means is accomplished through the rotation of the thumb screw 82.

Operation of the device of Fig. 3 is the same as that described for the device of Fig. 1 except that the release of the lever 73 and the resulting pull of the wire 24 through the tube 23 depends upon the expansion of the bellows 80 under heat, which expansion moves the metal strip 79 out of latching position, rather than upon the deflection of a bimetal strip as in the devices of Figs. 1 and 2. Resetting of the device is the same process as that described for the resetting of the device of Fig. 1.

When tripping mechanism V and X of Figs. 2 and 3 are used with indicating mechanism I of Fig. 1, wire 24 normally is under no strain, for the same reasons as were noted with reference to the indicating and tripping mechanisms of Fig. 1.

From the foregoing description it is apparent that I have provided an inexpensive temperature indicating device for transformers, which can readily be installed on a transformer already in use without the slightest alteration and without making additional openings in the transformer casing and which can be positioned on the transformer so as to be visible from a reasonable distance.

I claim:

1. In a device of the class described including a member biased for movement from a first position to a second position, the combination with a movable latching lever normally holding said member in said first position, of tripping mechanism including a biased operating lever, a flexible connection between said latching lever and operating lever, said operating lever biased for movement to withdraw said latching lever from latching position through the medium of said flexible connection, and a thermally responsive latch normally holding said operating lever against releasing movement.

2. In a device of the class described including a member biased for movement from a first position to a second position, the combination with a pivotally mounted latching lever normally holding said member in said first position, of an elongated mounting bracket supporting said latching lever at one end, and tripping mechanism carried by the other end of said bracket including a pivotally mounted operating lever, a spring biasing said operating lever, a thermally responsive bimetal latch normally holding said operating lever against the bias of said spring, a tube carried by said bracket and extending from a point adjacent said latching lever to a point adjacent said operating lever, and a flexible wire in said tube connecting said latching lever and operating lever.

ROLLAND D. NELSON.

REFERENCES CITED

The following references are of record in the file of this patent:

UNITED STATES PATENTS

| Number | Name | Date |
|---|---|---|
| 1,420,137 | Parker | Jan. 20, 1922 |
| 1,668,388 | Treanor | May 1, 1928 |
| 1,770,233 | Gillette | July 8, 1930 |
| 1,807,310 | Ellman | May 26, 1931 |
| 1,892,948 | Harvey | Jan. 3, 1933 |
| 2,049,960 | Jones et al. | Aug. 4, 1936 |
| 2,230,612 | Crise et al. | Feb. 4, 1941 |
| 2,249,887 | Dayton | July 22, 1941 |
| 2,311,206 | Bulpitt | Feb. 16, 1943 |
| 2,393,312 | Davenport | Jan. 22, 1946 |
| 2,428,539 | Armstrong | Oct. 7, 1947 |